United States Patent
Caudle

(10) Patent No.: US 11,865,525 B2
(45) Date of Patent: Jan. 9, 2024

(54) ZEOLITE WITH CU AND PD CO-EXCHANGED IN A COMPOSITE

(71) Applicant: BASF Corporation, Florham Park, NJ (US)

(72) Inventor: Matthew T. Caudle, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/756,205

(22) PCT Filed: Dec. 13, 2020

(86) PCT No.: PCT/US2020/064730
§ 371 (c)(1),
(2) Date: May 19, 2022

(87) PCT Pub. No.: WO2021/119565
PCT Pub. Date: Jun. 17, 2021

(65) Prior Publication Data
US 2022/0347661 A1 Nov. 3, 2022

Related U.S. Application Data

(60) Provisional application No. 62/947,824, filed on Dec. 13, 2019.

(51) Int. Cl.
| | | |
|---|---|---|
| *B01J 29/072* | (2006.01) | |
| *B01J 35/04* | (2006.01) | |
| *B01J 35/00* | (2006.01) | |
| *B01J 37/30* | (2006.01) | |
| *B01J 37/08* | (2006.01) | |
| *B01D 53/94* | (2006.01) | |
| *F01N 3/20* | (2006.01) | |
| *F01N 3/28* | (2006.01) | |
| *F01N 3/021* | (2006.01) | |
| *F01N 3/08* | (2006.01) | |

(52) U.S. Cl.
CPC ........ *B01J 29/072* (2013.01); *B01D 53/9418* (2013.01); *B01D 53/9472* (2013.01); *B01J 35/0006* (2013.01); *B01J 35/04* (2013.01); *B01J 37/08* (2013.01); *B01J 37/30* (2013.01); *F01N 3/021* (2013.01); *F01N 3/0842* (2013.01); *F01N 3/2066* (2013.01); *F01N 3/2803* (2013.01); *B01D 2255/1023* (2013.01); *B01D 2255/20738* (2013.01); *B01D 2255/20761* (2013.01); *B01D 2255/50* (2013.01); *B01D 2255/9032* (2013.01); *B01D 2255/9155* (2013.01); *B01J 2229/20* (2013.01); *B01J 2229/38* (2013.01); *F01N 2370/04* (2013.01); *F01N 2610/02* (2013.01); *F01N 2610/1453* (2013.01)

(58) Field of Classification Search
CPC ...... B01J 29/072; B01J 35/0006; B01J 35/04; B01J 37/08; B01J 37/30; B01J 2229/20; B01J 2229/38; B01D 53/9418; B01D 53/9472; B01D 2255/1023; B01D 2255/20738; B01D 2255/20761; B01D 2255/50; B01D 2255/9032; B01D 2255/9155; F01N 3/021; F01N 3/0842; F01N 3/2066; F01N 3/2803; F01N 2370/04; F01N 2610/02; F01N 2610/1453
See application file for complete search history.

(56) References Cited

U.S. PATENT DOCUMENTS

| | | |
|---|---|---|
| 5,164,350 A | 11/1992 | Abe et al. |
| 2011/0158877 A1 | 6/2011 | Pieterse |
| 2014/0234190 A1* | 8/2014 | McKenna .......... B01D 53/9481 502/73 |
| 2016/0136626 A1 | 5/2016 | Phillips et al. |
| 2018/0085707 A1* | 3/2018 | Feaviour ............. B01J 37/0205 |
| 2019/0001268 A1* | 1/2019 | Chen ................. B01D 53/9472 |
| 2021/0162382 A1* | 6/2021 | Hengst ................ B01J 29/7446 |

FOREIGN PATENT DOCUMENTS

WO WO 2007/069441 A1 * 6/2007 ............. B01D 53/94

OTHER PUBLICATIONS

International Search Report dated Apr. 23, 2021, International Application No. PCT/US2020/064730.
Praserthdram Piyasan et al., "Effect of Pd on the stability improvement of Cu/H-MFI . . . " Journal of Molecular Catalysis, vol. 169, No. 1-2, pp. 113-126, 2001.
Castagnola N B et al., "Studies of Cu-ZSM-5 by X-ray absorption spectroscopy . . . ," Elsevier, vol. 290, No. 1-2, pp. 110-122, 2005.
Nomura et al., "PD-PT Bimetallic Catalysts Supported on SAPO-5 for Catalytic . . . ," Catalysis Letters, vol. 53, No. 3/04, pp. 167-169, 1998.

* cited by examiner

*Primary Examiner* — Timothy C Vanoy
(74) *Attorney, Agent, or Firm* — DLA Piper LLP (US)

(57) ABSTRACT

The present disclosure provides catalyst compositions and catalytic articles capable of storing and/or reducing nitrogen oxide ($NO_x$) emissions in engine exhaust, catalyst articles coated with such compositions, and processes for preparing such catalyst compositions and articles. The catalyst compositions include copper and palladium co-exchanged zeolites. Further provided is a process for preparing such co-exchanged zeolites, an exhaust gas treatment system including the catalytic articles disclosed herein, and methods for reducing $NO_x$ in an exhaust gas stream using such catalytic articles and systems.

24 Claims, 7 Drawing Sheets

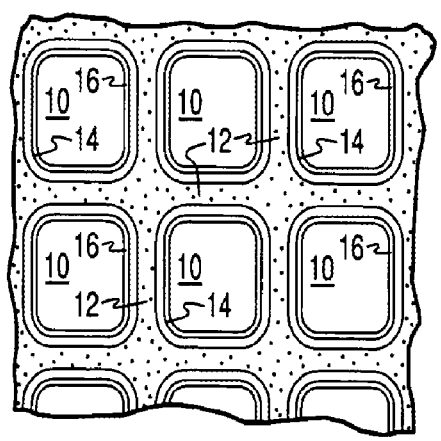
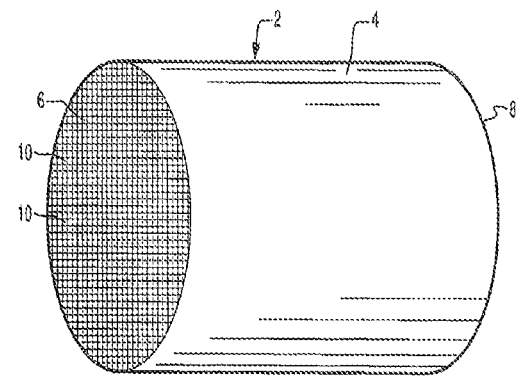
Fig. 1A
Fig. 1B

ZEOLITE WITH CU AND PD CO-EXCHANGED IN A COMPOSITE

This application is a national stage filing under 35 U.S.C. § 371 of International Application No. PCT/US2020/064730, filed on Dec. 13, 2020, which claims the benefit of priority to U.S. Provisional Application No. 62/947,824, filed on Dec. 193, 2019; the disclosure of each of these applications are each incorporated herein by reference in its entirety.

The present disclosure relates generally to the field of exhaust gas treatment catalysts, particularly catalyst compositions capable of selectively reducing nitrogen oxides in engine exhaust, catalyst articles coated with such compositions, and processes for preparing such catalyst compositions. Also provided are catalyst compositions for low temperature trapping of nitric oxide (NO) and Selective Catalytic Reduction (SCR) of nitrogen oxides ($NO_x$), and processes for their preparation.

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia or an ammonia precursor) in the presence of atmospheric oxygen, resulting in the formation predominantly of nitrogen and steam:

$$4NO+4NH_3+O_2 \rightarrow 4N_2+6H_2O \quad \text{(standard SCR reaction)}$$

$$2NO_2+4NH_3+O_2 \rightarrow 3N_2+6H_2O \quad \text{(slow SCR reaction)}$$

$$NO+NO_2+2NH_3 \rightarrow 2N_2+3H_2O \quad \text{(fast SCR reaction)}$$

Current catalysts employed in the SCR process include molecular sieves, such as zeolites, ion-exchanged with a catalytic metal such as iron or copper. A useful SCR catalyst composition is able to catalyze the reduction of the $NO_x$ exhaust component at temperatures above about 200° C. and below about 600° C., so that reduced $NO_x$ levels can be achieved even under conditions of low load which typically are associated with lower exhaust temperatures.

Increasingly stringent emissions regulations have driven the need for developing SCR catalysts with improved capacity to manage $NO_x$ emissions, such as under lean, low engine exhaust temperature conditions, while also exhibiting sufficient high temperature thermal stability. As emission regulations become stricter, it is becoming increasingly important to address cold-start $NO_x$ emissions from vehicles. This represents a challenge, as there is no known methodology for reducing $NO_x$ to $N_2$ at temperatures less than about 1150° C., characteristic of vehicle cold-start conditions. NO traps composed of Pd-exchanged zeolites have been developed recently to trap NO during cold-start and are used in conjunction with an SCR article to extend the thermal window for $NO_x$ abatement to lower temperatures. In spite of recent developments in SCR and NO trapping technologies, there remains a need in the art for catalysts to effectively abate $NO_x$ emissions from exhaust gas streams under cold-start conditions.

The present disclosure generally relates to catalyst compositions for low temperature trapping and selective catalytic reduction (SCR) of nitrogen oxides ($NO_x$) from an exhaust gas stream of a lean-burn engine. Surprisingly, it has been discovered according to the present disclosure that it is possible to co-exchange base metal ions and Pd ions into a zeolite with high efficiency and selectivity for the ion exchange sites within the zeolite pores. Co-exchanged zeolite catalyst materials so produced exhibit high loadings of the ion-exchanged base metal and Pd, and dual activity for $NO_x$ adsorption and reduction in a single catalytic composition. The process for producing such co-exchanged zeolite catalyst materials as well as the zeolite catalyst materials themselves possess additional advantages as disclosed herein.

Accordingly, in one aspect there is provided a catalyst composition for low temperature trapping and selective catalytic reduction (SCR) of nitrogen oxides ($NO_x$) from an exhaust gas stream of a lean-burn engine, the catalyst composition comprising a zeolite comprising an ion-exchanged base metal and ion-exchanged palladium.

In some embodiments, at least a portion of the ion-exchanged base metal and the ion-exchanged palladium are present in ionic form within the exchange sites of the zeolite.

In some embodiments, the zeolite has a structure type chosen from AH, APT, AFX, CHA, EAB, ERI, UT, LEY, LTN, MSO, SAS. SAT, SAY, SFW, TSC, and combinations thereof. In some embodiments, the zeolite has the CHA structure type. In some embodiments, the zeolite is an aluminosilicate zeolite having a silica-to-alumina ratio (SAR) of from about 5 to about 100. In some embodiments, the aluminosilicate zeolite has a SAR of from about 10 to about 40.

In some embodiments, the ion-exchanged base metal is chosen from Cu, Fe, Co, Ni, La, Mn, V, Ce. Nd, Pr, Ti, Cr, Zn, Nb, Mo, Hf, Y, W, and combinations thereof. In some embodiments, the ion-exchanged base metal is Cu, Fe, or a combination thereof. In some embodiments, the ion-exchanged base metal, calculated as the base metal oxide, is present in the zeolite in an amount of from about 0.01% to about 15% by weight based on the total weight of the calcined ion-exchanged zeolite on a volatile-free basis. In some embodiments, the ion-exchanged base metal is Cu. In some embodiments, the Cu, calculated as CuO, is present in the zeolite in an amount of from about 0.1% to about 4% by weight based on the total weight of the calcined ion-exchanged zeolite on a volatile-free basis.

In some embodiments, the ion-exchanged palladium, calculated as elemental palladium, is present in the zeolite in an amount of from about 0.01% to about 4% by weight based on the total weight of the calcined ion-exchanged zeolite on a volatile-free basis.

In another aspect there is provided a catalyst article for low temperature trapping and SCR of $NO_x$, the catalyst article comprising: a substrate; and a first washcoat comprising a catalyst composition according to the present disclosure, disposed on at least a portion of the substrate.

In some embodiments the substrate is a honeycomb. In some embodiments, the honeycomb substrate is a wall-flow filter substrate or a flow-through substrate.

In some embodiments, the catalyst article is effective to adsorb nitric oxide (NO) at temperatures from about 20° C. to about 200° C.

In some embodiments, the catalyst article is effective to reduce NO and $NO_x$ at temperatures above about 200° C.

In some embodiments, the catalyst article further comprises a second washcoat disposed on at least a portion of the substrate, the second washcoat comprising an SCR catalyst composition. In some embodiments, the first and second washcoats are present in a zoned configuration. In some embodiments, the second washcoat is disposed downstream from the first wash coat.

In some embodiments, the catalyst article is effective to reduce $NO_x$ emissions in the exhaust gas stream under a cold start condition by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream, wherein the cold start condition comprises an exhaust gas stream temperature that is below about 150° C.

In a further aspect there is provided an exhaust gas treatment system for treating an exhaust gas stream from a lean burn engine, the exhaust gas treatment system comprising a catalytic article according to the present disclosure, in fluid communication with the exhaust gas stream. In some embodiments, the exhaust gas treatment system further comprises one or more additional components chosen from a diesel oxidation catalyst (DOC), a soot filter, a selective catalytic reduction (SCR) catalyst, a urea injection component, an ammonia oxidation (AMOx) catalyst, a lean NOx trap (LNT), and combinations thereof. In some embodiments, the lean-burn engine is a diesel engine.

In a still further aspect there is provided a method for reducing a $NO_x$ level in an exhaust gas stream of a lean-burn engine, the method comprising contacting the exhaust gas stream with a catalytic article or exhaust gas treatment system according to the present disclosure, for a time and at a temperature sufficient to reduce the level of $NO_x$ in the exhaust gas stream by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream.

In yet another aspect there is provided a process for preparing a zeolite co-exchanged with ions of both a base metal and palladium, the process comprising contacting a zeolite comprising ions of the base metal with a source of palladium ions in an aqueous medium, such that the palladium ions are ion-exchanged into the zeolite comprising ions of the base metal, to thus form the zeolite co-exchanged with ions of both a base metal and palladium.

In some embodiments, the process further comprises drying the zeolite co-exchanged with ions of both a base metal and palladium; and calcining the zeolite co-exchanged with ions of both a base metal and palladium.

In some embodiments, the source of palladium ions is $[Pd(NH_3)_4][OH]_2$. In some embodiments, the base metal is Cu, Fe, or a combination thereof. In some embodiments, at least a portion of the ion-exchanged base metal and the ion-exchanged palladium are present in ionic form within the exchange sites of the zeolite.

In some embodiments, the zeolite has a structure type chosen from AEI, AFT, AFX, CHA, EAB, ERI, KFI, LEV, LTN, MSO, SAS, SAT, SAN, SFW, TSC, and combinations thereof. In some embodiments, the zeolite has the CHA structure type. In some embodiments, the zeolite is an aluminosilicate zeolite having a silica-to-alumina ratio (SAR) of from about 5 to about 100. In some embodiments, the aluminosilicate zeolite has a SAR of from about 10 to about 40.

In some embodiments, the ion-exchanged base metal is present in the zeolite in an initial concentration; after contacting the zeolite comprising ions of a base metal with the source of palladium ions in an aqueous medium, the ion-exchanged base metal is present in the zeolite in a final concentration; and the final concentration is within about 10% of the initial concentration.

In some embodiments, the ion-exchanged palladium, calculated as elemental palladium, is present in the zeolite in an amount of from about 0.01% to about 4% by weight based on the total weight of the calcined ion-exchanged zeolite on a volatile-free basis.

In some embodiments, the ion-exchanged base metal is Cu and the Cu, calculated as CuO, is present in the zeolite in an amount of from about 0.1% to about 4% by weight based on the total weight of the calcined ion-exchanged zeolite on a volatile-free basis. In some embodiments, the ion-exchanged palladium, calculated as elemental palladium, is present in the zeolite in an amount of from about 0.1% to about 4% by weight based on the total weight of the calcined ion-exchanged zeolite on a volatile-free basis. In some embodiments, at least about 50% of the Cu and at least about 50% of the palladium reside in the ion-exchange sites in the pore network of the zeolite.

In order to provide an understanding of embodiments of the present disclosure, reference is made to the appended drawings, in which reference numerals refer to components of exemplary embodiments of the disclosure. The drawings are exemplary only and should not be construed as limiting the present disclosure. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1A is a perspective view of a honeycomb-type substrate Which may comprise a catalyst composition (i.e., in the form of a washcoat) in accordance with the present disclosure;

FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1A, in an embodiment wherein the substrate is a flow-Through substrate;

Figure 5A:
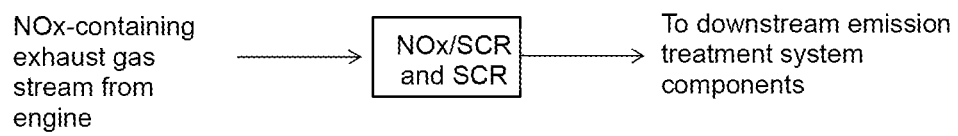
Figure 5B:
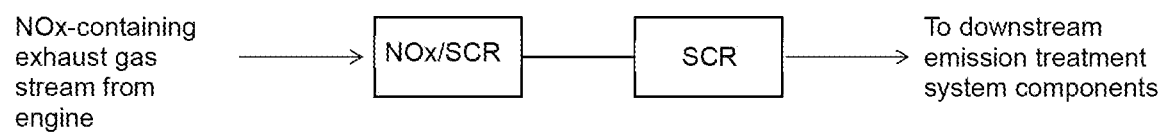

FIG. 5A is a schematic depiction of an embodiment of an emission treatment system of the present disclosure comprising the $NO_x$ adsorber/SCR catalyst composition as described herein disposed on a substrate in a first zone; and an SCR catalyst composition disposed on the same substrate in a second zone downstream from the first zone to form a singular $NO_x$ adsorber/SCR/SCR catalyst article; wherein the $NO_x$ adsorber/SCR/SCR catalyst article is located downstream of and in fluid communication with a lean burn engine; and FIG. 5B is a schematic depiction of an embodiment of an emission treatment system of the present disclosure comprising a $NO_x$ adsorber/SCR catalyst composition as described herein disposed on a first substrate to form a combined $NO_x$ adsorber/SCR catalyst article; and a SCR catalyst article disposed on a second substrate, wherein the $NO_x$ adsorber/SCR catalyst article is located downstream of and in fluid communication with a lean burn engine, and the SCR catalyst article is located downstream of and in fluid communication with the combined $NO_x$ adsorber/SCR article.

The present disclosure provides catalyst compositions for low temperature trapping and selective catalytic reduction (SCR) of nitrogen oxides ($NO_x$) from an exhaust gas stream of a lean-burn engine. Further provided are methods of preparation of the disclosed SCR catalyst compositions as well as catalyst articles, exhaust treatment systems and methods of treating exhaust streams, each comprising the disclosed catalyst compositions.

Surprisingly, as disclosed herein, it was found that a zeolite material comprising both palladium (Pd) ions and base metal ions, with both ion types co-exchanged into the zeolite pore network, may be efficiently prepared with near quantitative uptake of the Pd ions. Such zeolites are capable of functioning simultaneously as both an NO trap and an SCR catalyst, and have additional advantageous properties.

Before describing several exemplary embodiments of the present disclosure, it is to be understood that the present disclosure is not limited to the details of construction or process steps set forth in the following description. The present disclosure is capable of other embodiments and of being practiced or being carried out in various was.

The articles "a" and "an" herein refer to one or to more than one (e.g., at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0. Recitation of ranges of values herein are merely intended to serve as a shorthand method of referring individually to each separate value falling within the range, unless otherwise indicated herein, and each separate value is incorporated into the specification as if it were individually recited herein.

"AMOx" refers to a selective ammonia oxidation catalyst, which is a catalyst comprising one or more metals (typically Pt, although not limited thereto) and an SCR catalyst capable of converting ammonia to nitrogen.

As used herein, "base metal" refers to a compound comprising a transition metal or lanthanide (e.g., vanadium (V), tungsten (W), titanium (Ti), copper (Cu), iron (Fe), cobalt (Co), nickel (Ni), chromium (Cr), manganese (Mn), cerium (Co), lanthanum (La), praseodymium (Pr), zinc (Zn), niobium (Nb), zirconium (Zr), molybdenum (Mo), tin (Sn), silver (Ag), gold (Au), or combinations thereof), that is catalytically active for reduction of $NO_x$, or promotes another catalytic component to be more active for reduction of $NO_x$. Base metals include copper, iron, manganese, tin, cobalt, nickel, and combinations thereof. For ease of reference herein, concentrations of base metal are reported in terms of the metal oxide.

As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

The term "catalyst" refers to a material that promotes a chemical reaction. The catalytically active species are also termed "promoters" as they promote chemical reactions.

The term "catalytic article" or "catalyst article" refers to a component that is used to promote a desired reaction. The present catalytic articles comprise a "substrate" having at least one catalytic coating disposed thereon.

"CSF" refers to a catalyzed soot filter, which is a wall-flow monolith. A wall-flow filter comprises alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, a CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters anchor stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95% effective, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

"GDI" refers to a gasoline direct injection engine, which operates under lean burn conditions.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of about 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases.

As used herein, "impregnated" or "impregnation" refers to permeation of the catalytic material into the porous structure of the support material.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

"LNT" refers to a lean $NO_x$ trap, which is a catalyst comprising a platinum group metal (e.g., Pt and Rh), cerin, and an alkaline-earth trap material suitable to adsorb $NO_x$ during lean conditions (for example, BaO or MgO). Under rich conditions, $NO_x$ is released and reduced to nitrogen.

"LT-NA" refers to a low temperature $NO_x$ adsorber, which is a composition containing, for example, a palladium exchanged zeolite. Under cold-start conditions, $NO_x$ is adsorbed, and is then released as the exhaust stream increases in temperature.

As used herein, the phrase "molecular sieve" refers to framework materials such as zeolites and other framework materials (e.g., isomorphously substituted materials), which may, in particulate form, and in combination with one or more promoter metals, be used as catalysts. Molecular sieves are materials based on an extensive three-dimensional network of oxygen ions containing generally tetrahedral type sites and having a uniform pore distribution, with the average pore size being no larger than about 20 Å.

Molecular sieves can be differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the type and amount of cations included in the molecular sieves lattice, range from about 3 to about 10 Å in diameter. The phrase "8-ring" molecular sieve refers to a molecular sieves having 8-ring pore openings and double-six ring secondary building units and having a cage like structure resulting from the connection of double six-ring building units by 4 rings. Molecular sieves comprise small pore, medium pore and large pore molecular sieves and combinations thereof. The pore sizes are defined by the ring size.

The term "$NO_x$" refers to nitrogen oxide compounds, such as NO, $NO_2$, or $N_2O$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

A "platinum group metal (PGM)" refers to any PGM (e.g., Ru, Rh, Os, Ir, Pd, Pt, and/or Au). Reference to "PGM" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like, which, upon calcination or use of the catalyst, decomposes or otherwise converts to a catalytically active form, usually the metal or the metal oxide.

As used herein, the term "promoted" refers to a component that is added to, e.g., a zeolitic material, typically through ion exchange, as opposed to impurities inherent in the zeolite. A zeolite may, for example, be promoted with copper (Cu) and/or iron (Fe), although other catalytic metals could be used, such as manganese, cobalt, nickel, cerium, platinum, palladium, rhodium, and combinations thereof.

The term "promoter metal(s)" refers to one or more metals added to an ion-exchanged zeolite to generate a modified "metal-promoted" molecular sieve. The promoter metal is added to the ion-exchanged zeolite to enhance the catalytic activity of the active metal residing at the exchange site in the zeolite compared to ion-exchanged zeolites that do not contain a promoter metal, e.g., the addition of aluminum as a promoter metal to a copper ion-exchanged zeolite enhances the catalytic activity of copper by preventing and/or reducing the formation of catalytically less active copper oxide clusters.

As used herein, the term "selective catalytic reduction" (SCR) refers to the catalytic process of reducing oxides of nitrogen to nitrogen ($N_2$) using a nitrogenous reductant. SCR catalyst compositions generally contain a zeolite promoted with a metal such as copper, iron, or a combination thereof.

"SCRoF" (i.e., SCR on filter) refers to an SCR catalyst composition coated directly onto a wall-flow filter.

"Substantially free" means "little or no" or "not intentionally added" and also having only trace and/or inadvertent amounts. For instance, in certain embodiments, "substantially free" means less than about 2 wt. % (weight %), less than about 1.5 wt. %, less than about 1.0 wt. %, less than about 0.5 wt. %, less than about 0.25 wt. % or less than about 0.01 wt. %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Reference to "monolithic substrate" means a unitary structure that is homogeneous and continuous from inlet to outlet.

As used herein, the term "support" or "support material" refers to any material, such as a high surface area material, usually a refractory metal oxide material, upon which a metal is applied (e.g., PGMs, stabilizers, promoters, binders, and the like) through precipitation, association, dispersion, impregnation, or other suitable methods. Exemplary supports include porous refractory metal oxide supports as described herein below. The term "supported" means "dispersed on", "incorporated into", "impregnated into", "on", "in", "deposited on" or otherwise associated with.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

"Washcoat" has its usual meaning in the art of a thin, adherent coating of a material (e.g., a catalyst) applied to a "substrate", such as a honeycomb flow-through monolith substrate or a filter substrate Which is sufficiently porous to permit the passage therethrough of the gas stream being treated. As used herein and as described in fleck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A washcoat is formed by preparing a slurry containing a specified solids content (e.g., about 30 to about 90% by weight) of catalyst in a liquid, which is then coated onto a substrate and dried to provide a washcoat layer. A substrate can contain one or more washcoat layers, and each washcoat layer can be different in some way (e.g., may differ in physical properties thereof such as, for example particle size or crystallite phase) and/or may differ in the chemical catalytic functions.

As used herein, the term "zeolite" refers to a specific example of a molecular sieve including silicon and aluminum atoms. Generally, a zeolite is defined as an aluminosilicate with an open 3-dimensional framework structure composed of corner-sharing $TO_4$ tetrahedra, where T is Al or Si, or optionally P. A zeolite may comprise $SiO_4/AlO_4$ tetrahedra that are linked by common oxygen atoms to form a three-dimensional network. Cations that balance the charge of the anionic framework are loosely associated with the framework oxygens, and the remaining pore volume is filled with water molecules. The non-framework cations are generally exchangeable, and the water molecules removable. Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO and MeAlPO materials are considered non-zeolitic molecular sieves.

Zeolites are microporous solids containing pores and channels of various dimensions. Cations that balance the charge of the anionic framework are loosely associated with the framework oxygens, and the remaining pore volume is filled with water molecules. The non-framework cations are generally exchangeable, and the water molecules removable. A wide variety of cations can occupy these pores and can move through these channels. As used herein, the term "intra-pore site" refers to sites available for cations within the pore structure of zeolites. Intra-pore sites refer to all the internal spaces within the pore structure of the zeolite that can be occupied by cations, such as, for example, exchange sites and/or defect sites. "Exchange sites" refers to sites available for cations, which are mainly occupied by ion-exchanged metal cations e.g., Cu and Pd), which are added to the zeolite in order to adsorb $NO_x$ species and/or to promote a chemical reaction.

Unless otherwise indicated, all parts and percentages are by weight. "Weight percent (wt %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications, and patents referred to herein are hereby incorporated by reference.

The present disclosure provides a catalyst composition for low temperature trapping and selective catalytic reduction (SCR) of nitrogen oxides ($NO_x$) from an exhaust gas stream of a lean-burn engine, the catalyst composition comprising a zeolite comprising an ion-exchanged base metal and ion-exchanged palladium. Such a catalyst composition is referred to herein as a $NO_x$ adsorber/SCR catalyst composition. The individual components of the catalyst composition are further described herein below.

As previously described herein, the term zeolite refers to a specific example of a molecular sieve including silicon and aluminum atoms. According to one or more embodiments, the zeolite can be based on the framework topology by which the structures are identified. In some embodiments, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGE, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFE, SFG, SFH, SEN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

Zeolites may be further characterized by reference to their pore size, as referenced herein with respect to molecular sieves. Present zeolites may be small pore, medium pore, or large pore zeolites, and combinations thereof.

A small pore zeolite contains channels defined by up to eight tetrahedral atoms. As used herein, the term "small pore" refers to pore openings which are smaller than about 5 Angstroms, for example on the order of about 3.8 Angstroms. Examples of small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

A medium pore zeolite contains channels defined by ten-membered rings. Examples of medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

A large pore zeolite contains channels defined by twelve-membered rings. Examples of large pore zeolites include framework types AFI, AER, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, UST, UWY, VET and mixtures or intergrowths thereof.

In some embodiments, the zeolite has a structure type chosen from AEI, AFT, AFX, CHA, EAB, ERI, KFI, LEV, LTN, MSO, SAS, SAT, SAV, SFW, TSC, and combinations thereof. In some embodiments, the zeolite has a structure type CHA. In some embodiments, the zeolite is SSZ-13.

The molar ratio of silica-to-alumina ("SAR") of a present zeolite can vary over a wide range, but is generally about 2 or greater. For instance, a present zeolite may have a SAR of from about 5 to about 1000. In some embodiments, the zeolite has a silica to alumina molar ratio (SAR) in the range of about 2 to about 300, such as, for example, about 5 to about 250, about 5 to about 200, about 5 to about 100, or about 5 to about 50. In some embodiments, the zeolite has a SAR in the range of about 10 to about 200, such as, for example, about 10 to about 100, about 10 to about 75, about 10 to about 60, or about 10 to about 50. In some embodiments, the zeolite has a SAR in the range of about 15 to about 100, such as, for example, about 15 to about 75, about 15 to about 60, or about 15 to about 50. In some embodiments, the zeolite has a SAR in the range of about 20 to about 100, such as, for example, about 20 to about 75, about 20 to about 60, or about 20 to about 50. In some embodiments, the molar ratio of Si to Al in the framework, calculated as a molar ratio of $SiO_2:Al_2O_3$, is from about 2 to about 100. In some embodiments, the molar ratio of Si to Al is from about 5 to about 100. In some embodiments, the molar ratio of Si to Al is from about 10 to about 40. In some embodiments, the molar ratio of Si to Al is about 25.

The present zeolites may exhibit a high surface area, for example a BET surface area, determined according to DIN 66131, of at least about 200 $m^2/g$, at least about 400 $m^2/g$, at least about 500 $in^2/g$, at least about 750 $m^2/g$, at least about 1000 $m^2/g$, or at least about 1400 $m^2/g$, for example from about 200 to about 1500 $m^2/g$, or from about 500 to about 750 $m^2/g$. "BEL surface area" has its usual meaning of referring to the Brunauer, Emmett, Teller method for determining surface area by $N_2$ adsorption. In some embodiments the PET surface area is from about 550 to about 700 $m^2/g$.

The $NO_x$ adsorber/SCR catalyst composition as disclosed herein comprise a zeolite comprising an ion-exchanged base metal and ion-exchanged palladium. In some embodiments, the base metal is chosen from Cu, Fe, Co, Ni, La, Mn, V, Ag, Ce, Nd, Pr, Ti, Cr, Zn, Nb, Mo, Hf, Y, W, and combinations thereof. In some embodiments, the ion-exchanged base metal is Cu, Fe, or a combination thereof. In certain embodiments, the base metal is Cu.

The amount of the ion-exchanged base metal present in the zeolite may vary. In some embodiments, the ion-exchanged base metal, calculated as the base metal oxide, is present in an amount of from about 0.1 to about 20% by weight based on the total weight of the calcined zeolite on a volatile-free basis. In some embodiments, the ion-exchanged base metal is present in an amount of from about 0.1, about 0.2, about 0.3, about 0.4, about 0.5, about 0.6, about 0.7, about 0.8, about 0.9, or about 1, to about 2, about 5, about 10, about 15, or about 20% by weight based on the total weight of the calcined zeolite. In some embodiments, the ion-exchanged base metal is Cu and the Cu, calculated as CuO, is present in the zeolite in an amount of from about 0.1% to about 4% by weight based on the total weight of the calcined zeolite, such as, for example, from about 1% to about 4%, from about 2% to about 4%, from about 2% to about 3%, or from about 3% to about 4% by weight based on the total weight of the calcined zeolite on a volatile-free basis.

The $NO_x$ adsorber/SCR catalyst compositions as disclosed herein comprise a zeolite comprising an ion-exchanged base metal and ion-exchanged palladium. In some embodiments, the ion-exchanged palladium, calculated as elemental palladium, is present in an amount of about 0.01 to about 20% by weight based on the total weight of the calcined zeolite on a volatile-free basis. In some embodiments, the ion-exchanged palladium is present in an amount of about 0.01, about 0.02, about 0.03, about 0.04, about 0.05, about 0.06, about 0.07, about 0.08, about 0.09, or about 0.1, to about 0.5, about 1, about 2, about 5, about 10, or about 20% by weight based on the total weight of the calcined zeolite on a volatile-free basis. In some embodiments, the ion-exchanged palladium, calculated as elemental palladium, is present in an amount of about 0.01% to about 4% by weight based on the total weight of the calcined ion-exchanged zeolite, such as, for example, about 1% to about 4%, about 2 to about 4%, or about 3% to about 4% by weight based on the total weight of the calcined ion-exchanged zeolite on a volatile-free basis.

In some embodiments, at least a portion of the ion-exchanged base metal and the ion-exchanged palladium are present in ionic form within the exchange sites of the zeolite. A portion of the ion-exchanged base metal and/or ion-exchanged palladium may be present outside of the exchange sites, for example, as particles of the corresponding base metal or palladium or oxides thereof, disposed on the surface of the zeolite. The present co-ion-exchanged zeolites are distinguished from, e.g., a physical mixture of a zeolite ion-exchanged with a base metal and a zeolite ion exchanged with palladium. The presence of both Pd and base metal ions in the ion-exchange sites of the zeolite may be determined by, for example, X-ray diffraction (XRD) studies. Extraction of unit cell parameters from XRD can be utilized to indicate the distribution of the ions within the zeolite material.

It is believed that the presence of both base metal ions and palladium ions in the exchange sites of the same zeolite may be of advantage. Without wishing to be bound by theory, it is believed that the physical proximity of the base metal ions and the palladium ions leads to more efficient transfer of $NO_x$ species trapped by the palladium ions under cold start conditions to the catalytically active base metal ions as the catalyst composition heats up to operating temperatures. Accordingly, non-productive desorption of, e.g., NO may be minimized. Further, it is possible to achieve higher loadings of base metal ions and palladium ions with co-exchange, leading to a more efficient catalyst. Finally, in some embodiments, a single catalytic article comprising a substrate coated with a catalytic composition according to the present disclosure may serve the combined role of $NO_x$ adsorption and SCR of $NO_x$ potentially eliminating the need for conventional separate $NO_x$ adsorption and SCR articles. In other embodiments, the combined $NO_x$ adsorption and SCR properties significantly enhance abatement of $NO_x$ in gaseous exhaust streams utilizing a conventional downstream SCR catalyst article.

In another aspect there is provided a process for preparing a zeolite co-exchanged with ions of both a base metal and palladium as disclosed herein. The process comprises contacting a zeolite comprising ions of the base metal with a source of palladium ions in an aqueous medium, such that the palladium ions are ion-exchanged into the zeolite comprising ions of the base metal, to thus form the zeolite co-exchanged with ions of both a base metal and palladium. In some embodiments, the base metal is Cu. In some embodiments, the base metal is Fe.

Various base metal-promoted zeolites and methods of their preparation are well known. Generally, a base metal (e.g., copper, iron, or the like) is ion-exchanged into the zeolite. Such base metals are generally ion exchanged into alkali metal or $NH_4$ zeolites (which can be prepared by $NH_4$ ion exchange into an alkali metal zeolite by methods known in the art, e.g., as disclosed in Bleken, F. et al., Topics in Catalysis 2009, 52, 215-228, which is incorporated herein by reference).

For additional promotion of SCR of oxides of nitrogen in addition to low temperature adsorption of $NO_x$ species, in some embodiments, the zeolite co-exchanged with ions of both a base metal and palladium can be promoted with two or more base metals (e.g., copper in combination with one or more other metals). In some embodiments, the base metal is a combination of Cu and Fe. Where two or more base metals are to be included in a metal promoted zeolitic material, multiple metal precursors (e.g., copper and iron precursors) can be ion-exchanged at the same time or separately. In certain embodiments, the second metal can be exchanged into a zeolite material that has first been promoted with the first metal (e.g., a second metal can be ion-exchanged into an iron or copper-promoted zeolite material).

In some embodiments, starting with such a base metal ion-exchanged zeolite, a source of palladium ions in an aqueous medium is contacted with the base metal ion-exchanged zeolite. In some embodiments, the source of palladium ions is $[Pd(NH_3)_4][OH]_2$. Without wishing to be bound by theory, it is believed that reaction of the hydroxide anions with protons present in the zeolite ion-exchange sites provides the driving force for the reaction according to Equation 1:

$$[Pd(NH_3)_4][OH]_2 + 2HZ \rightarrow PdZ_2 + 4NH_3 + 2H_2O \qquad (1)$$

The process as disclosed herein is superior to typical ion-exchange processes involving "inert" counter-ions (e.g., nitrate), where the degree of uptake of Pd will be influenced by an equilibrium established between $Pd(OH_2)_6^{2+}$ in solution and $Pd^{2+}$ in the zeolite, leading to less complete and reproducible uptake. The process as disclosed herein has the further advantage that the near quantitative or quantitative uptake of palladium ions avoids the need for extensive Pd recovery.

In some embodiments, at least a portion of the ion-exchanged base metal and the ion-exchanged palladium are present in ionic form within the exchange sites of the zeolite. As described herein, this is distinct from a zeolite comprising a base metal and palladium wherein a substantial portion of the base metal and palladium are disposed on or in the zeolite in non-ionic form (e.g., as the metal or an oxide thereof in clusters, and/or otherwise outside the ion exchange sites within the zeolite pores).

The process as disclosed herein has the further advantage that the uptake of palladium ions does not substantially displace the existing base metal ions (e.g., Cu). In some embodiments, the ion-exchanged base metal is present in the zeolite in an initial concentration. After contacting the zeolite comprising ions of the base metal with the source of palladium ions in an aqueous medium, the ion-exchanged base metal is present in the zeolite in a final concentration. In some embodiments, the final concentration is within about 10% of the initial concentration. For example, the final concentration of base metal ions (e.g., Cu) is within about 10%, about 9%, about 8%, about 7%, about 6%, about 5%, about 4%, about 3%, about 2%, about 1%, or even within less than about 1% of the initial concentration.

In some embodiments, the process as disclosed herein provides a co-exchanged zeolite wherein the ion-exchanged palladium, calculated as elemental palladium, is present in the zeolite in an amount of from about 0.01% to about 4% by weight, based on the total weight of the calcined ion-exchanged zeolite on a volatile-free basis.

In some embodiments, the process as disclosed herein provides a co-exchanged zeolite wherein the ion-exchanged base metal is Cu, and the Cu, calculated as CuO, is present in the zeolite in an amount of from about 0.1% to about 4% h weight, based on the total weight of the calcined ion-exchanged zeolite on a volatile-free basis. In some embodiments, the ion-exchanged palladium, calculated as elemental palladium, is present in the zeolite in an amount of from about 0.1% to about 4% by weight, based on the total weight of the calcined ion-exchanged zeolite on a volatile-free basis, and at least about 50% of the Cu and at least about 50% of the palladium reside in the ion-exchange sites in the pore network of the zeolite. For example, about 50%, about 60%, about 70%, about 80%, about 90%, about 95%, about 99%, or even about 100% of the Cu, the palladium, or both, reside in the ion-exchange sites in the pore network of the zeolite.

As described herein, any suitable zeolite may be utilized in the process. In some embodiments, the zeolite has a structure type chosen from AEI, AFT, AFX, CHA, EAB, ERI, KFI, LEV, LTN, MSO, SAS, SAT, SAV, SFW, TSC, and combinations thereof. In some embodiments, the zeolite has the CHA structure type. In some embodiments, the zeolite is an aluminosilicate zeolite having a silica-to-alumina ratio (SAR) of from about 5 to about 100. In some embodiments, the aluminosilicate zeolite has a SAR of from about 10 to about 40.

In some embodiments, the process further comprises drying the zeolite co-exchanged with ions of both a base metal and palladium, and calcining the zeolite co-exchanged with ions of both a base metal and palladium.

In another aspect there is provided a catalyst article for low temperature trapping and SCR of $NO_x$, the catalyst article comprising a substrate and a first washcoat comprising a $NO_x$ adsorber/SCR catalyst composition according to the present disclosure disposed on at least a portion of the substrate.

In one or more embodiments, the present $NO_x$ adsorber/SCR catalyst composition for low temperature trapping and SCR of $NO_x$ is disposed on one or more substrates to form a catalyst article. Catalytic articles comprising the substrates are generally employed as part of an exhaust gas treatment system (e.g., catalyst articles including, but not limited to, articles including the $NO_x$ adsorber/SCR catalyst composition as disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed catalyst(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst.

Ceramic substrates may be made of any suitable refractory material, e.g., cordierite, cordierite-α-alumina, aluminum titanate, silicon Inmate, silicon carbide, silicon nitride, zircon mullite, spodumene, alumina-silica-magnesia, zircon silicate, sillimanite, a magnesium silicate, zircon, petalite, α-alumina, an aluminosilicate, and the like, and combinations thereof.

Substrates may also be metallic, comprising one or more metals or metal alloys. A metallic substrate may include any metallic substrate, such as those with openings or "punchouts" in the channel walls. The metallic substrates may be employed in various shapes such as pellets, compressed metallic fibers, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from about 0 to about 20 wt. % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type having a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces, Such monolithic wall-flow filter substrates may contain up to about 900 or more flow passages (or "cells") per square inch of cross-section, although far fewer may be used. For example, the substrate may have from about 7 to about 600, more usually from about 100 to about 400, cells per square inch ("cpsi"), The cells can have cross-sections that are rectangular, square, circular, oval, triangular, hexagonal, or are of other polygonal shapes. The wall-flow filter substrate can be ceramic or metallic as described above.

FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition comprises both a discrete bottom layer 14 adhered to the walls 12 of the carrier member and a second discrete top layer 16 coated over the bottom layer 14. The present disclosure can be practiced with one or more (e.g., two, three, four or more) catalyst composition layers and is not limited to the two-layer embodiment illustrated in FIG. 1B. Further coating configurations are disclosed herein below.

Figure 2:
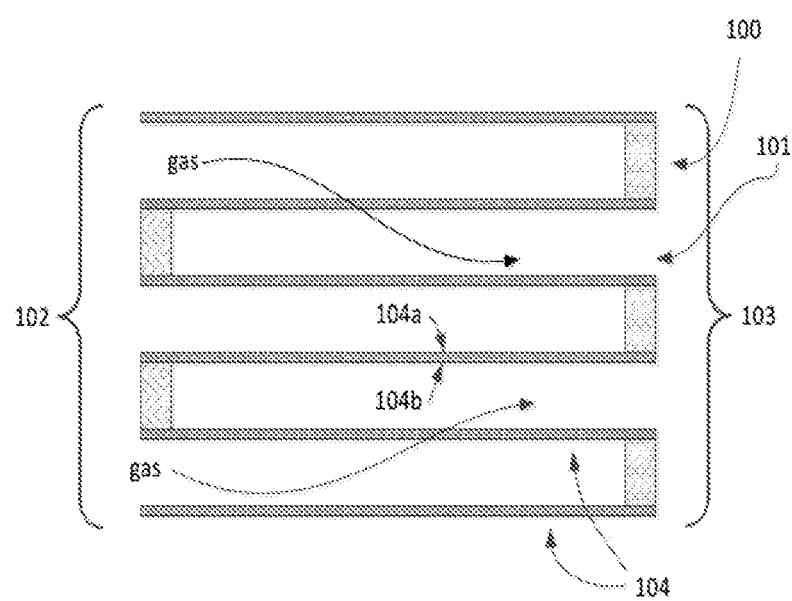
FIG. 2 is a cutaway view of a section enlarged relative to FIG. 1A, wherein the honeycomb-type substrate in FIG. 1A represents a wall-flow filter.

A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 $in^3$, about 100 $in^3$, about 200 $in^3$, about 300 $in^3$, about 400 $in^3$, about 500 $in^3$, about 600 $in^3$, about 700 $in^3$, about 800 $in^3$, about 900 $in^3$ or about 1000 in$^3$ to about 1500 in$^3$, about 2000 in$^3$, about 2500 in$^3$, about 3000 in$^3$, about 3500 in$^3$, about 4000 in$^3$, about 4500 in$^3$ or about 5000 in$^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of ≥40%, ≥50%, ≥60%, ≥65% or ≥70%. For instance, the wall-flow filter article substrate will have a wall porosity of from about 50%, about 60%, about 65% or about 70% to about 75% and an average pore diameter of from about 10, or about 20, to about 30, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

The present catalytic coating may comprise one or more coating layers, where at least one layer comprises a NO$_x$ adsorber/SCR catalyst composition according to the present disclosure. The catalytic coating may comprise one or more thin, adherent coating layers disposed on and in adherence to least a portion of a substrate. The entire coating comprises the individual "coating layers".

To produce NO$_x$ adsorber/SCR catalyst articles of the present disclosure, a substrate as described herein is coated with a NO$_x$ adsorber/SCR catalyst composition as disclosed herein. The coatings are "catalytic coating compositions" or "catalytic coatings." A "catalyst composition" and a "catalytic coating composition" are synonymous.

Generally, the catalyst composition is prepared and coated on a substrate. This method can comprise mixing a NO$_x$ adsorber/SCR catalyst composition according to the present disclosure with a solvent (e.g., water) to form a slurry for purposes of coating a catalyst substrate.

The NO$_x$ adsorber/SCR catalyst compositions slurry as disclosed herein may further comprise additional components, for example, binders and/or refractory metal oxides. An exemplary binder is a ZrO$_2$ binder derived from a suitable precursor, such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of SiO$_2$, including silicates and colloidal silica. Binder compositions may include any combination of zirconia, alumina, and silica.

Other exemplary binders include boehmite, gamma-alumina, or delta/theta alumina, as well as silica sol. When present, the binder is typically used in an amount of about 1-5 wt % of the total washcoat loading. Alternatively the binder can be zirconia-based or silica-based, for example zirconium acetate, zirconia sol or silica sol. When present, the alumina binder is typically used in an amount of about 0.05 g/in$^3$ to about 1 g/in$^3$.

The slurry may optionally contain various additional components. Typical additional components include, but are not limited to, binders as described herein above, additives to control, e.g., pH and viscosity of the slurry. Additional components can include hydrocarbon (HC) storage components (e.g., zeolites), associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of aqueous acetic acid.

The solids content of the slurry comprising particles of the metal ion-exchanged zeolite may vary according to intended usage. In some embodiments, the slurry has a solid content of from about 15 to about 45 wt %, based on the weight of said mixture.

The shiny can be milled to reduced particle size and to enhance mixing of the particles and formation of a homogenous material. The milling can be accomplished in a ball mill, continuous mill, or other similar equipment, and the solids content of the slurry may be, e.g., about 20 to about 60 wt %, or about 20 to about 40 wt %. In one embodiment, the post-milling slurry is characterized by a D$_{90}$ particle size of about 1 to about 40 microns, about 2 to about 20 microns, or about 4 to about 15 microns.

The present NO$_x$ adsorber/SCR catalyst compositions may be applied in the form of one or more washcoats containing the NO$_x$ adsorber/SCR catalyst composition as disclosed herein. A washcoat is formed by preparing a slurry containing a specified solids content (e.g., about 10 to about 60% by weight) of catalyst composition (or one or more components of the catalyst composition) in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

The present catalytic coating may comprise one or more coating layers, where at least one layer comprises the present catalyst composition or one or more components of the catalyst composition. The catalytic coating may comprise one or more thin, adherent coating layers disposed on and in adherence to least a portion of a substrate. The entire coating comprises the individual "coating layers".

In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a washcoat disposed on the substrate" means on any surface, for example on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present $NO_x$ adsorber/SCR catalyst compositions may be in a top coating layer over a bottom coating layer. The $NO_x$ adsorber/SCR catalyst composition may be present in a top and a bottom layer. Any one layer may extend the entire axial length of the substrate, for instance a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80% or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% of the substrate length from either the inlet end of outlet end, wherein at least a portion of the top layer overlays the bottom layer. This "overlay" zone may for example extend from about 5% to about 80% of the substrate length, for example about 5%, about 10%, about 20%, about 30%, about 40%, about 50%, about 60% or about 70% of the substrate length.

In some embodiments, a $NO_x$ adsorber/SCR catalyst composition as disclosed herein, disposed on a substrate as disclosed herein, comprises a first washcoat, wherein the first washcoat is disposed on at least a portion of the length of the catalyst substrate; and a second washcoat comprising an additional SCR catalyst composition, wherein the second washcoat is disposed on at least a portion of the length of the catalyst substrate. Any suitable SCR catalyst composition may be utilized; such SCR compositions are known in the art.

In some embodiments, the first washcoat is disposed directly on the catalyst substrate, and the second washcoat is disposed on at least a portion of the first washcoat. In some embodiments, the second washcoat, is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the second washcoat is disposed directly on the catalyst substrate from the inlet end to a length of from about 50% to about 100% of the overall length; and the first washcoat is disposed on at least a portion of the second washcoat. In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length from about 20 to about 40% of the overall length, and the second washcoat extends from the inlet end to the outlet end. In some embodiments, the second washcoat is disposed directly on the catalyst substrate from the outlet end to a length of from about 50% to about 100% of the overall length, and the first washcoat is disposed on at least a portion of the second washcoat. In some embodiments, the first washcoat is disposed directly on the catalyst substrate covering about 100% of the overall length, and the second washcoat is disposed on the first washcoat covering about 100% of the overall length. In some embodiments, the second washcoat is disposed directly on the catalyst substrate covering about 100% of the overall length, and the first washcoat is disposed on the second washcoat covering about 100% of the overall length.

The catalytic coating may be "zoned," comprising zoned catalytic layers, that is, where the catalytic coating contains varying compositions across the axial length of the substrate. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may be four different zones, etc. Where two layers are adjacent and do not overlap, there are upstream and downstream zones. Where two layers overlap to a certain degree, there are upstream, downstream, and middle zones. Where, for example, a coating layer extends the entire length of the substrate and a different coating layer extends from the outlet end a certain length and overlays a portion of the first coating layer, there are upstream and downstream zones.

For instance, the present $NO_x$ adsorber/SCR catalyst articles may comprise an upstream zone comprising the first washcoat layer comprising the $NO_x$ adsorber/SCR catalyst composition as disclosed herein; and a downstream zone comprising the second washcoat layer comprising a SCR catalyst composition as described herein. Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and the second washcoat is disposed on the catalyst substrate from the inlet end to a length of from about 50% to about 90% of the overall length.

Figure 3A:
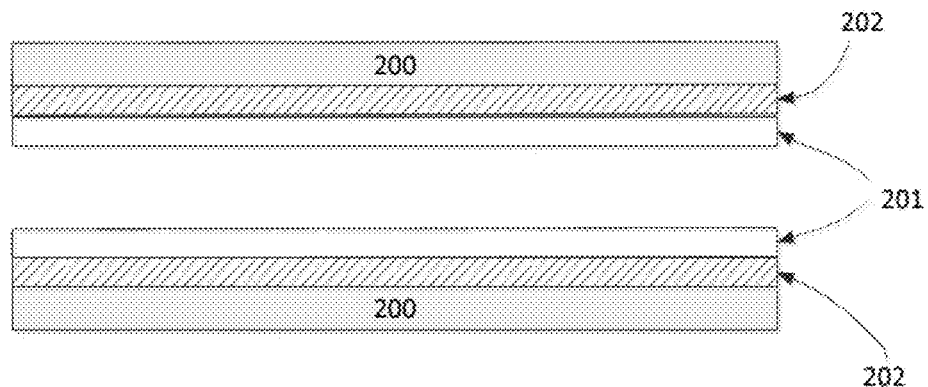
FIG. 3A is a cross-sectional view of an embodiment of a catalyst article of the present disclosure having a layered configuration.
Figure 3B:
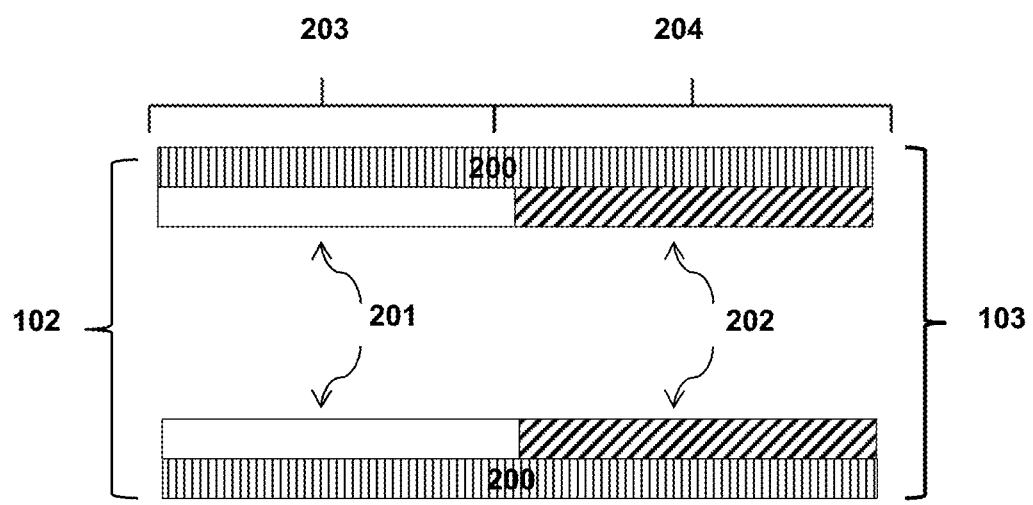
FIG. 3B is a cross-sectional view of an embodiment of a catalyst article of the present disclosure having a zoned configuration.
Figure 3C:
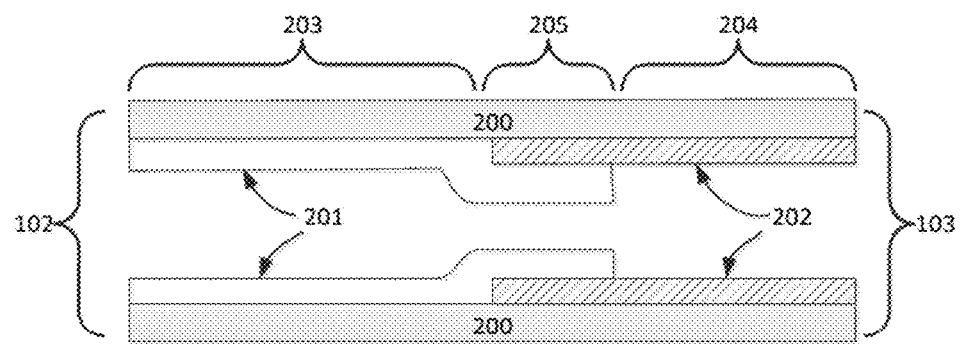
FIG. 3C is a cross-sectional view of an embodiment of a catalyst article of the present disclosure having a layered and zoned configuration (i.e., having overlapping layers)
Figure 3D:
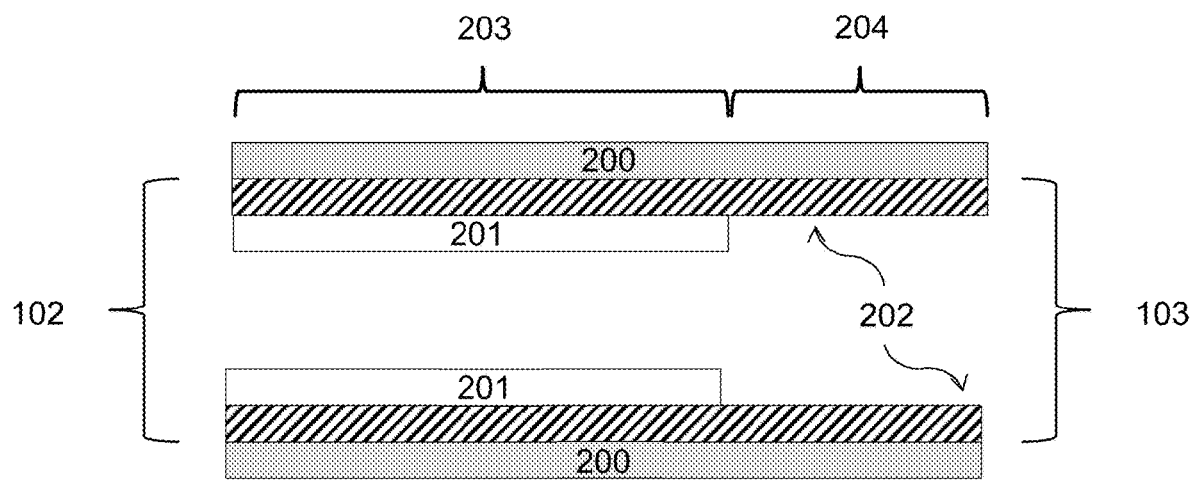
FIG. 3D is a cross-sectional view of an embodiment of a catalyst article of the present disclosure having another layered and zoned configuration.
Figure 3E:
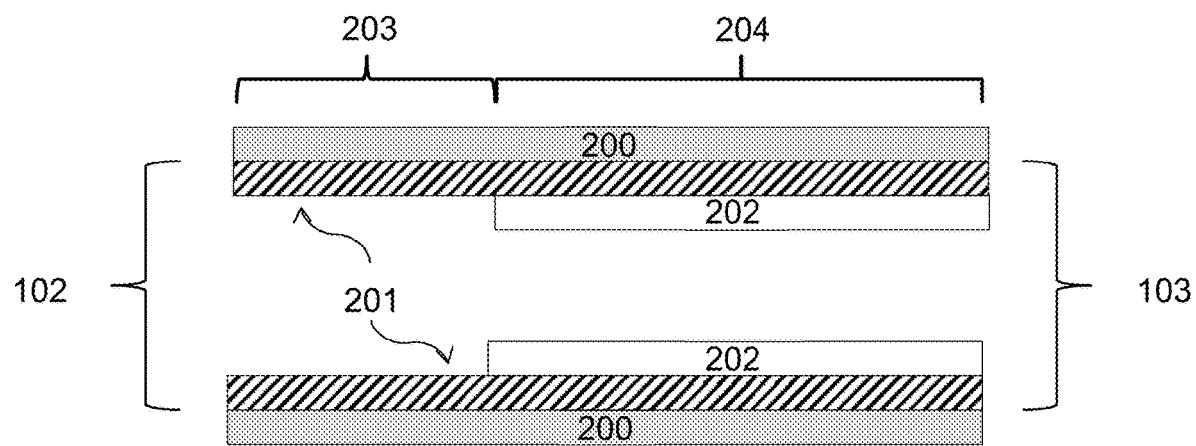
FIG. 3E is a cross-sectional view of an embodiment of a catalyst article of the present disclosure having yet another layered and zoned configuration.

FIGS. 3A, 3B, 3C, 3D, and 3E illustrate example coating layer configurations with two coating layers. Shown are substrate walls 200 onto which coating layers 201 (top coat) and 202 (bottom coat) are disposed. These are simplified illustrations, and in the case of a porous substrate, not shown are pores and coatings in adherence to pore walls and not shown are plugged ends. In FIG. 3A, coating layers 201 and 202 each extend the entire length of the substrate with top layer 201 overlaying bottom layer 202. The substrate of FIG. 3A does not contain a zoned coating configuration. FIG. 3B is illustrative of a zoned configuration having a coating layer 202 which extends from the outlet about 50% of the substrate length to form a downstream zone 204, and a coating layer 201 which extends from the inlet about 50% of the substrate length, providing an upstream zone 203. In FIG. 3C, bottom coating layer 202 extends from the outlet about 50% of the substrate length and top coating layer 201 extends from the inlet greater than 50% of the length and overlays a portion of layer 202, providing an upstream zone 203, a middle overlay zone 205 and a downstream zone 204. In FIG. 3D, bottom coating layer 202 extends from the inlet about 100% of the substrate length and top coating layer 201 extends from the inlet greater than 50% of the length and overlays a portion of layer 202, providing an upstream zone 203, and a downstream zone 204. In FIG. 3E, bottom coating layer 201 extends from the inlet about 100% of the substrate length and top coating layer 202 extends from the outlet greater than 50% of the length and overlays a portion of layer 201, providing an upstream zone 203, and a downstream zone 204. FIGS. 3A to 3E may be useful to illustrate coating compositions on a wall-through substrate or the flow-through substrate.

The present $NO_x$ adsorber/SCR catalyst articles as disclosed herein are effective to adsorb $NO_x$ components and catalyze the reduction of $NO_x$ from a lean burn engine exhaust gas in the presence of a reductant (e.g., ammonia or an ammonia precursor). Present articles are effective to adsorb and/or catalyze the reduction of $NO_x$ over a variety of temperatures, and are effective at lower temperatures. In some embodiments, the $NO_x$ adsorber/SCR catalyst articles according to the present disclosure are effective to adsorb nitric oxide (NO) at temperatures from about 20° C. to about 200° C., for example, from about 20° C., about 30° C., about 40° C., about 50° C., about 60° C., about 70° C., about 80° C., about 90 CC, or about 100° C. to about 150° C., about 175° C., or about 200° C. In some embodiments, the $NO_x$ adsorber/SCR catalyst articles according to the present disclosure are effective to reduce $NO_x$ at temperatures above about 200° C., for example, from about 200° C., about 250° C., about 300° C., or about 350° C. to about 400° C., about 450° C., about 500° C., about 550° C., or about 600° C.

In some embodiments, the $NO_x$ adsorber/SCR catalyst articles according to the present disclosure are effective to reduce $NO_x$ emissions in the exhaust gas stream under a cold start condition by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream, wherein the cold start condition comprises an exhaust gas stream temperature that is below about 150° C., for example, from about 20° C. to about 150° C.

In a further aspect there is provided an exhaust gas treatment system for treating an exhaust gas stream from a lean burn engine, the exhaust gas treatment system comprising a $NO_x$ adsorber/SCR catalyst article according to the present disclosure in fluid communication with the exhaust gas stream. The engine can be, e.g., a diesel engine which operates at combustion conditions with air in excess of that required for stoichiometric combustion, i.e., lean conditions. In other embodiments, the engine can be a lean burn gasoline engine or an engine associated with a stationary source (e.g., electricity generators or pumping stations).

Exhaust gas treatment systems generally contain more than one catalytic article positioned downstream from the engine in fluid communication with the exhaust gas stream. A system may contain, for instance, a selective catalytic reduction catalyst (SCR), a diesel oxidation catalyst (DOC) and one or more articles containing a reductant injector, a soot filter, an ammonia oxidation catalyst (AMOx) or a lean $NO_x$ trap (LNT), and combinations thereof. An article containing a reductant injector is a reduction article. A reduction system includes a reductant injector and/or a pump and/or a reservoir, etc. The present exhaust gas treatment system may further comprise a soot filter and/or an ammonia oxidation catalyst. A soot filter may be uncatalyzed or may be catalyzed (CST). For example, in some embodiments, exhaust gas treatment systems according to the present disclosure may comprise, in addition to a $NO_x$ adsorber/SCR catalyst article as disclosed herein, disposed from upstream to downstream a DOC, a CSF, a urea injector, a SCR article, an article containing an AMOx, a lean $NO_x$ trap (LNT), and combinations thereof may also be included.

The relative placement of the various catalytic components present within the emission treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 4:
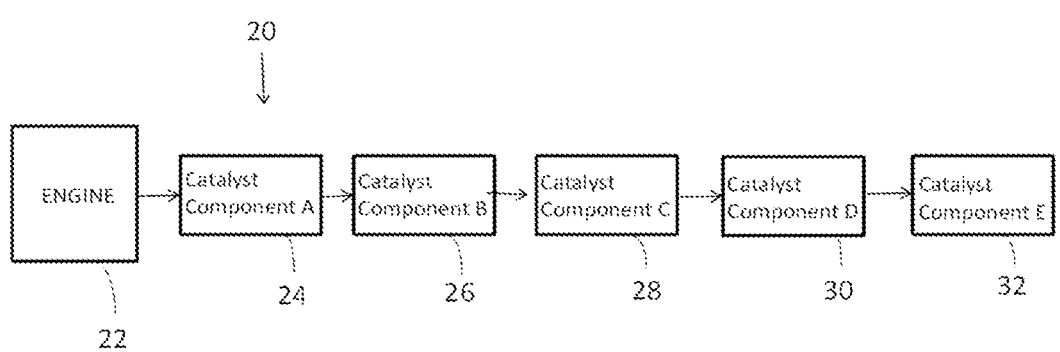
FIG. 4 is a schematic depiction of an embodiment of an emission treatment system of the present disclosure in which a catalyst article for low temperature trapping and SCR of $NO_x$ is utilized.

One exemplary emission treatment system is illustrated in FIG. 4, which depicts a schematic representation of an emission treatment system 20. As shown, the emission treatment system can include a plurality of catalyst components in series downstream of an engine 22, such as, for example, a lean burn diesel or gasoline engine. At least one of the catalyst components will be a $NO_x$ adsorber/SCR catalyst article according to the present disclosure. The $NO_x$ adsorber/SCR catalyst composition of the present disclosure could be combined with numerous additional catalyst materials and could be placed at various positions relative to the additional catalyst materials. FIG. 4 illustrates five catalyst components, 24, 26, 28, 30, and 32, in series; however, the total number of catalyst components can vary and five components is merely one example. One of skill in the art will recognize that it may be desirable to arrange the relative position of each article in a different order than illustrated herein; such alternative ordering is contemplated by the present disclosure.

Without intending to be limiting, Table 1 presents various example exhaust gas treatment system configurations according to one or more embodiments of the present disclosure. It is noted that each catalyst is connected to the next catalyst via exhaust conduits such that the engine is upstream of Component A, which is upstream of Component B, which is upstream of Component C, which is upstream of Component D, which is upstream of Component E (when present). The reference to Components A-E in Table 1 can be cross-referenced with the same designations in FIG. 4.

"DOC" in Table 1 refers to a diesel oxidation catalyst as defined hereinabove. The DOC component may comprise any suitable DOC catalyst composition.

"CSF" in Table 1 refers to a catalyzed soot filter as defined hereinabove. The CSF component may comprise any suitable oxidation catalyst composition.

"LNT" in Table 1 refers to a lean NOx trap as defined hereinabove. The LNT component may comprise any suitable LNT catalyst composition.

"SCR" in Table 1 refers to a selective catalytic reduction catalyst as defined hereinabove. The SCR component may comprise any suitable SCR catalyst composition.

"SCRoF" in Table 1 refers to a selective catalytic reduction catalyst coated on a wall-flow filter as defined hereinabove. The SCRoF component may comprise any suitable SCR catalyst composition.

"AMOx" in Table 1 refers to a selective ammonia oxidation catalyst as defined hereinabove. The AMOx component may comprise any suitable AMOx catalyst composition. In some embodiments, an AMOx catalyst may be provided downstream of the other components to remove any slipped ammonia from the exhaust gas treatment system. In some embodiments, the optional AMOx component may be a standalone catalyst article comprising an AMOx catalyst composition coated on a separate substrate from the other components and positioned downstream and in fluid communication with the other components. In other embodiments, the optional AMOx component may comprise an AMOx catalyst composition coated on a portion (e.g., an outlet zone) of the component immediately upstream of the optional AMOx component in the exemplary exhaust gas treatment systems according to Table 1. For example, with reference to configuration 1 in Table 1, in some embodiments Components B and C may comprise separate catalyst articles, wherein Component B comprises an SCR catalyst composition coated on a first substrate and Component C comprises an AMOx catalyst composition coated on a second substrate positioned downstream and in fluid communication with the first substrate. In other embodiments of configuration 1, Components B and C may comprise a single catalyst article comprising an SCR catalyst composition and an AMOx catalyst composition coated on a single substrate in a zoned configuration (e.g., comprising an SCR upstream zone and an AMOx downstream zone).

"$NO_x$/SCR" in Table 1 refers to a NO adsorber/SCR catalyst according to the present disclosure. The $NO_x$/SCR component may comprise any $NO_x$ adsorber/SCR catalyst composition according to the present disclosure. In some embodiments, the $NO_x$/SCR component is a standalone catalyst article comprising a $NO_x$ adsorber/SCR catalyst composition coated on a separate substrate from the other components in the exhaust gas treatment system. In some embodiments, the $NO_x$/SCR component may comprise the $NO_x$ adsorber/SCR catalyst composition coated on a flow-through substrate. In some embodiments, the $NO_x$/SCR component may comprise the $NO_x$ adsorber/SCR catalyst composition coated on a wall-flow filter substrate.

"$NO_x$/SCR/SCR" in Table 1 refers to a single catalyst article comprising both a $NO_x$ adsorber/SCR catalyst according to the present disclosure and an SCR catalyst as defined hereinabove. For example, in some embodiments, the $NO_x$/SCR/SCR component may comprise a $NO_x$ adsorber/SCR catalyst composition according to the present disclosure disposed on a substrate in a first zone and an SCR catalyst composition disposed on the same substrate in a second zone downstream from the first zone to form a singular $NO_x$ adsorber/SCR/SCR catalyst article as depicted in FIG. 5A. In some embodiments, the substrate may be a flow-through substrate.

"$NO_x$/SCR/SCRoF" in Table 1 refers to a single catalyst article comprising both a $NO_x$ adsorber/SCR catalyst according to the present disclosure and an SCRoF catalyst as defined hereinabove. For example, in some embodiments, the $NO_x$/SCR/SCRoF component may comprise a $NO_x$ adsorber/SCR catalyst composition according to the present disclosure disposed on a wall-flow filter substrate in a first zone and an SCR catalyst composition disposed on the same wall-flow filter substrate in a second zone downstream from the first zone to form a singular $NO_x$ adsorber/SCR/SCROF catalyst article.

As recognized by one skilled in the art, in the configurations listed in Table 1, any one or more of components A, B, C, D, or E can be disposed on a particulate filter, such as a wall flow filter, or on a flow-through honeycomb substrate. In some embodiments, an engine exhaust gas treatment system comprises one or more catalyst compositions mounted in a position near the engine (i.e., in a close-coupled ("CC") position), with additional catalyst components in a position underneath the vehicle body (i.e., in an underfloor ("UF") position). In some embodiments, the exhaust gas treatment system may further comprise a urea injection component.

TABLE 1

Possible exhaust gas treatment system configurations

| Config. | Component A | Component B | Component C | Component D | Component E |
|---|---|---|---|---|---|
| 1 | DOC | SCR | Optional AMOx | — | — |
| 2 | DOC | SCRoF | Optional AMOx | — | — |
| 3 | DOC | SCRoF | SCR | Optional AMOx | — |
| 4 | DOC | SCR | SCRoF | Optional AMOx | — |
| 5 | DOC | CSF | SCR | Optional AMOx | — |
| 6 | LNT | CSF | SCR | Optional AMOx | — |
| 7 | LNT | SCRoF | SCR | Optional AMOx | — |
| 8 | DOC | $NO_x$/SCR | Optional AMOx | — | — |
| 9 | DOC | $NO_x$/SCR | SCR | Optional AMOx | — |

TABLE 1-continued

Possible exhaust gas treatment system configurations

| Config. | Component A | Component B | Component C | Component D | Component E |
|---|---|---|---|---|---|
| 10 | DOC | $NO_x$/SCR/SCR | Optional AMOx | — | — |
| 11 | DOC | $NO_x$/SCR/SCR | SCR | Optional AMOx | — |
| 12 | DOC | $NO_x$/SCR/SCRoF | Optional AMOx | — | — |
| 13 | DOC | $NO_x$/SCR/SCRoF | SCR | Optional AMOx | — |
| 14 | DOC | $NO_x$/SCR | SCRoF | Optional AMOx | — |
| 15 | DOC | $NO_x$/SCR/SCR | SCRoF | Optional AMOx | — |
| 16 | DOC | CSF | $NO_x$/SCR | Optional AMOx | — |
| 17 | DOC | CSF | $NO_x$/SCR/SCR | Optional AMOx | — |
| 18 | DOC | CSF | $NO_x$/SCR | SCR | Optional AMOx |
| 19 | DOC | CSF | $NO_x$/SCR/SCR | SCR | Optional AMOx |
| 20 | LNT | CSF | $NO_x$/SCR | Optional AMOx | — |
| 21 | LNT | CSF | $NO_x$/SCR/SCR | Optional AMOx | — |
| 22 | LNT | CSF | $NO_x$/SCR | SCR | Optional AMOx |
| 23 | LNT | CSF | $NO_x$/SCR/SCR | SCR | Optional AMOx |
| 24 | LNT | $NO_x$/SCR/SCRoF | Optional AMOx | — | — |
| 25 | LNT | $NO_x$/SCR/SCRoF | SCR | Optional AMOx | — |

It is further contemplated herein that certain catalytic functions can be combined in a single article or may be disposed as separate articles. In some embodiments, the $NO_x$ adsorber/SCR catalyst as disclosed herein may be combined with a conventional SCR catalyst on a single substrate, or on separate substrates within a single article. Two non-limiting configurations of a $NO_x$ adsorber/SCR catalyst as disclosed herein combined with a conventional SCR catalyst are depicted in FIGS. 5A and 5B.

Referring to FIG. 5A, the $NO_x$ adsorber/SCR catalyst composition as described herein is disposed on a substrate in a first zone; and an SCR catalyst composition is disposed on the same substrate in a second zone, downstream from the first zone, to form a singular $NO_x$ adsorber/SCR/SCR catalyst article. The $NO_x$ adsorber/SCR/SCR catalyst article is located downstream of and in fluid communication with a lean burn engine.

Referring to FIG. 5B, the $NO_x$ adsorber/SCR catalyst composition as described herein is disposed on a first substrate to form a $NO_x$ adsorber/SCR catalyst article. A conventional SCR catalyst article is disposed on a second substrate, wherein the $NO_x$ adsorber/SCR catalyst article is located downstream of and in fluid communication with a lean burn engine, and the conventional SCR catalyst article is located downstream of and in fluid communication with the combined $NO_x$ adsorber/SCR article.

In another aspect of the present disclosure there is provided a method for reducing a $NO_x$ level in an exhaust gas stream of a lean-burn engine, such as a lean burn gasoline engine or diesel engine. Generally, the method comprises contacting the exhaust gas stream with a catalytic article of the present disclosure, or an emission treatment system of the present disclosure. More specifically, the method comprises contacting the exhaust gas stream with a $NO_x$ adsorber/SCR catalyst article as disclosed herein, or an exhaust gas treatment system as disclosed herein, for a time and at a temperature sufficient to reduce the level of $NO_x$ in the exhaust gas stream. The degree of reduction in the level of $NO_x$ may vary. In some embodiments, the level is reduced by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream.

The temperature range over which the $NO_x$ adsorber/SCR catalyst article is effective to adsorb nitric oxide (NO) and/or to reduce NO and $NO_x$ may vary. For example, in some embodiments, the $NO_x$ adsorber/SCR catalyst article is effective to adsorb NO at temperatures from about 20° C. to about 200° C., for example, from about 20° C., about 30° C., about 40° C., about 50° C. about 60° C., about 70° C., about 80° C., about 90° C., or about 100° C. to about 150° C., about 175° C., or about 200° C. In some embodiments, the $NO_x$ adsorber/SCR catalyst article is effective to reduce $NO_x$ at temperatures above about 200° C., such as, for example, from about 200° C., about 250° C., about 300° C., or about 350° C. to about 400° C., about 450° C., about 500° C., about 550° C., or about 600° C.

The method can include placing the $NO_x$ adsorber/SCR catalyst article as disclosed herein downstream from an engine and flowing the engine exhaust gas stream over the catalyst article. In one or more embodiments, the method further comprises placing additional catalyst components downstream from the engine as noted above.

The present catalyst compositions, articles, systems, and methods are suitable for treatment of exhaust gas streams of internal combustion engines, for example gasoline, light-duty diesel and heavy duty diesel engines. The catalyst compositions are also suitable for treatment of emissions from stationary industrial processes, removal of noxious or toxic substances from indoor air or for catalysis in chemical reaction processes.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

Without limitation, some embodiments according to the present disclosure include:

1. A catalyst composition for low temperature trapping and selective catalytic reduction (SCR) of nitrogen oxides ($NO_x$)

from an exhaust gas stream of a lean-burn engine, the catalyst composition comprising a zeolite comprising an ion-exchanged base metal and ion-exchanged palladium.

2. The catalyst composition of embodiment 1, wherein at least a portion of the ion-exchanged base metal and the ion-exchanged palladium are present in ionic form within the exchange sites of the zeolite.

3. The catalyst composition of embodiment 1 or 2, wherein the zeolite has a structure type chosen from AEI, AFT, AFX, CHA, EAB, ERI, KFI, LEV, LTN, MSO, SAS, SAT, SAV, SFW, TSC, and combinations thereof.

4. The catalyst composition of any of embodiments 1 to 3, wherein the zeolite has the CHA structure type.

5. The catalyst composition of any of embodiments 1 to 4, wherein the zeolite is an aluminosilicate zeolite having a silica-to-alumina ratio (SAR) of from about 5 to about 100.

6. The catalyst composition of embodiment 5, wherein the aluminosilicate zeolite has a SAR of from about 10 to about 40.

7. The catalyst composition of any of embodiments 1 to 6, wherein the ion-exchanged base metal is chosen from Cu, Fe, Co, Ni, La, Mn, V, Ag, Ce, Nd, Pr, Ti, Cr, Zn, Nb, Mo, Hf, Y, W, and combinations thereof.

8. The catalyst composition of any of embodiments 1 to 7, wherein the ion-exchanged base metal is Cu, Fe, or a combination thereof.

9. The catalyst composition of any of embodiments 1 to 8, wherein the ion-exchanged base metal, calculated as the base metal oxide, is present in the zeolite in an amount of from about 0.01% to about 15.0% by weight based on the total weight of the calcined ion-exchanged zeolite on a volatile-free basis.

10. The catalyst composition of embodiment 9, wherein the ion-exchanged base metal is Cu and wherein the Cu, calculated as CuO, is present in the zeolite in an amount of from about 0.1% to about 4.0% by weight based on the total weight of the calcined ion-exchanged zeolite on a volatile-free basis.

11. The catalyst composition of any of embodiments 1 to 10, wherein the ion-exchanged, palladium, calculated as elemental palladium, is present in the zeolite in an amount of from about 0.01% to about 4.0% by weight, based on the total weight of the calcined ion-exchanged zeolite on a volatile-free basis.

12. A catalyst article for low temperature trapping and SCR of $NO_x$, the catalyst article comprising:
a substrate; and
a first washcoat comprising the catalyst composition according to any one of embodiments 1-11 disposed on at least a portion of the substrate.

13. The catalyst article of embodiment 12, wherein the substrate is a honeycomb, and wherein the honeycomb substrate is a wall-flow filter substrate or a flow-through substrate.

14. The catalyst article of embodiment 12 or 13, wherein the catalyst article is effective to adsorb nitric oxide (NO) at temperatures from about 20° C. to about 200° C.

15. The catalyst article of any of embodiments 12 to 14, wherein the catalyst article is effective to reduce NO and $NO_x$ at temperatures above about 200° C.

16. The catalyst article of any of embodiments 12 to 15, further comprising a second washcoat disposed on at least a portion of the substrate, the second washcoat comprising an SCR catalyst composition.

17. The catalyst article of embodiment 16, wherein the first and second washcoats are present in a zoned configuration, and wherein the second washcoat is disposed downstream from the first washcoat.

18. The catalyst article of any of embodiments 12 to 17, wherein the catalyst article is effective to reduce $NO_x$ emissions in the exhaust gas stream under a cold start condition by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream, wherein the cold start condition comprises an exhaust gas stream temperature that is below about 150° C.

19. An exhaust gas treatment system for treating an exhaust gas stream from a lean burn engine, the exhaust gas treatment system comprising the catalytic article of any one of embodiments 12 to 18 in fluid communication with the exhaust gas stream.

20. The exhaust gas treatment system of embodiment 19, further comprising one or more additional components chosen from a diesel oxidation catalyst (DOC), a soot filter, a selective catalytic reduction (SCR) catalyst, a urea injection component, an ammonia oxidation (AMOx) catalyst, a lean $NO_x$ trap (LNT), and combinations thereof.

21. The exhaust gas treatment system of embodiment 19 or 20, wherein the lean-burn engine is a diesel engine.

22. A method for reducing a $NO_x$ level in an exhaust gas stream of a lean-burn engine, the method comprising contacting the exhaust gas stream with the catalytic article of any one of embodiments 12 to 18, or the exhaust gas treatment system of any of embodiments 19 to 21, for a time and at a temperature sufficient to reduce the level of $NO_x$ in the exhaust gas stream by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream.

23. A process for preparing a zeolite co-exchanged with ions of both a base metal and palladium, the process comprising contacting a zeolite comprising ions of the base metal with a source of palladium ions in an aqueous medium, such that the palladium ions are ion-exchanged into the zeolite comprising ions of the base metal, to thus form the zeolite co-exchanged with ions of both a base metal and palladium.

24. The process of embodiment 23, further comprising drying the zeolite co-exchanged with ions of both a base metal and palladium; and calcining the zeolite co-exchanged with ions of both a base metal and palladium.

25. The process of embodiment 23 or 24, wherein the source of palladium ions is $[Pd(NH_3)_4][OH]_2$.

26. The process of embodiment 23 or 25, wherein the base metal is Cu, Fe, or a combination thereof.

27. The process of any of embodiments 23 to 26, wherein at least a portion of the ion-exchanged base metal and the ion-exchanged palladium are present in ionic form within the exchange sites of the zeolite.

28. The process of any of embodiments 23 to 27, wherein the zeolite has a structure type chosen from AEI, AFT, AFX, CHA, EAB, ERI, KFI, LEV, LTN, MSO, SAS, SAT, SAV, SFW, TSC, and combinations thereof.

29. The process of any of embodiments 23 to 28, wherein zeolite has the CHA structure type.

30. The process of any of embodiments 23 to 29, wherein the zeolite is an aluminosilicate zeolite having a silica-to-alumina ratio (SAR) of from about 5 to about 100.

31. The process of any of embodiments 23 to 30, wherein the aluminosilicate zeolite has a SAR of from about 10 to about 40.

32. The process of any of embodiments 23 to 31, wherein the ion-exchanged base metal is present in the zeolite in au initial concentration;
after contacting the zeolite comprising ions of a base metal with the source of palladium ions in an aqueous medium, the ion-exchanged base metal is present in the zeolite in a final concentration; and
the final concentration is within about 10% of the initial concentration.

33. The process of any of embodiments 23 to 32, wherein the ion-exchanged palladium, calculated as elemental palladium, is present in the zeolite in an amount of from about 0.01% to about 4.0% by weight, based on the total weight of the calcined ion-exchanged zeolite on a volatile-free basis.

34. The process of an of embodiments 23 to 33, wherein:
the ion-exchanged base metal is Cu and the Cu, calculated as CuO, is present in the zeolite in an amount of from about 0.1% to about 4.0% by weight, based on the total weight of the calcined ion-exchanged zeolite on a volatile-free basis;
the ion-exchanged palladium, calculated as elemental palladium, is present in the zeolite in an amount of from about 0.1% to about 4.0% by weight, based on the total weight of the calcined ion-exchanged zeolite on a volatile-free basis; and
at least about 50% of the Cu and at least about 50% of the palladium reside in the ion-exchange sites in the pore network of the zeolite.

What is claimed is:

1. A catalyst composition for low temperature trapping and selective catalytic reduction (SCR) of nitrogen oxides ($NO_x$) from an exhaust gas stream of a lean-burn engine, the catalyst composition comprising a zeolite comprising an ion-exchanged base metal and ion-exchanged palladium, wherein at least a portion of the ion-exchanged base metal and the ion-exchanged palladium are present in ionic form within the exchange sites of the zeolite.

2. The catalyst composition of claim 1, wherein the zeolite has a structure type chosen from AEI, AFT, AFX, CHA, EAB, ERI, KFI, LEV, LTN, MSO, SAS, SAT, SAV, SFW, TSC, and combinations thereof.

3. The catalyst composition of claim 1, wherein the zeolite is an aluminosilicate zeolite having a silica-to-alumina ratio (SAR) of from about 5 to about 100.

4. The catalyst composition of claim 1, wherein the ion-exchanged base metal is chosen from Cu, Fe, Co, Ni, La, Mn, V, Ag, Ce, Nd, Pr, Ti, Cr, Zn, Nb, Mo, Hf, Y, W, and combinations thereof.

5. The catalyst composition of claim 1, wherein the ion-exchanged base metal, calculated as the base metal oxide, is present in the zeolite in an amount of from about 0.01% to about 15% by weight based on the total weight of the calcined ion-exchanged zeolite on a volatile-free basis.

6. The catalyst composition of claim 5, wherein the ion-exchanged base metal is Cu and wherein the Cu, calculated as CuO, is present in the zeolite in an amount of from about 0.1% to about 4% by weight based on the total weight of the calcined ion-exchanged zeolite on a volatile-free basis.

7. The catalyst composition of claim 1, wherein the ion-exchanged palladium, calculated as elemental palladium, is present in the zeolite in an amount of from about 0.01% to about 4% by weight, based on the total weight of the calcined ion-exchanged zeolite on a volatile-free basis.

8. A catalyst article for low temperature trapping and SCR of $NO_x$, the catalyst article comprising:
a substrate; and
a first washcoat comprising the catalyst composition according to claim 1 disposed on at least a portion of the substrate.

9. The catalyst article of claim 8, wherein the substrate is a honeycomb, and wherein the honeycomb substrate is a wall-flow filter substrate or a flow-through substrate.

10. The catalyst article of claim 8, wherein the catalyst article is effective to reduce $NO_x$ emissions in the exhaust gas stream under a cold start condition by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream, wherein the cold start condition comprises an exhaust gas stream temperature that is below about 150° C.

11. A catalyst article for low temperature trapping and SCR of $NO_x$, the catalyst article comprising:
a substrate;
a first washcoat disposed on at least a portion of the substrate and comprising a catalyst composition for low temperature trapping and selective catalytic reduction (SCR) of nitrogen oxides (NOx) from an exhaust gas stream of a lean-burn engine, the catalyst composition comprising a zeolite comprising an ion-exchanged base metal and ion-exchanged palladium, and
a second washcoat disposed on at least a portion of the substrate, the second washcoat comprising an SCR catalyst composition.

12. The catalyst article of claim 11, wherein the first and second washcoats are present in a zoned configuration, and wherein the second washcoat is disposed downstream from the first washcoat.

13. An exhaust gas treatment system for treating an exhaust gas stream from a lean burn engine, the exhaust gas treatment system comprising the catalytic article of claim 8 in fluid communication with the exhaust gas stream.

14. The exhaust gas treatment system of claim 13, further comprising one or more additional components chosen from a diesel oxidation catalyst (DOC), a soot filter, a selective catalytic reduction (SCR) catalyst, a urea injection component, an ammonia oxidation (AMOx) catalyst, a lean $NO_x$ trap (LNT), and combinations thereof.

15. A method for reducing a $NO_x$ level in an exhaust gas stream of a lean-burn engine, the method comprising contacting the exhaust gas stream with the catalytic article of claim 8, for a time and at a temperature sufficient to reduce the level of $NO_x$ in the exhaust gas stream by at least about 10%, at least about 15%, at least about 25%, at least about 35%, at least about 45%, at least about 55%, at least about 65%, at least about 75%, at least about 85%, or at least about 95% by weight, based on the total amount of $NO_x$ present in the exhaust gas stream.

16. A process for preparing a zeolite co-exchanged with ions of both a base metal and palladium, the process comprising contacting a zeolite comprising ions of the base metal with a source of palladium ions in an aqueous medium, such that the palladium ions are ion-exchanged into the zeolite comprising ions of the base metal, to thus form the zeolite co-exchanged with ions of both a base metal and palladium, wherein at least a portion of the ion-exchanged base metal and the ion-exchanged palladium are present in ionic form within the exchange sites of the zeolite.

17. The process of claim 16, further comprising drying the zeolite co-exchanged with ions of both a base metal and palladium; and calcining the zeolite co-exchanged with ions of both a base metal and palladium.

18. The process of claim 16, wherein the source of palladium ions is $[Pd(NH_3)_4][OH]_2$.

19. The process of claim 16, wherein the base metal is Cu, Fe, or a combination thereof.

20. The process of claim 16, wherein the zeolite has a structure type chosen from AEI, AFT, AFX, CHA, EAB, ERI, KFI, LEV, LTN, MSO, SAS, SAT, SAV, SFW, TSC, and combinations thereof.

21. The process of claim 16, wherein the zeolite is an aluminosilicate zeolite having a silica-to-alumina ratio (SAR) of from about 5 to about 100.

22. The process of claim 16, wherein:
the ion-exchanged base metal is present in the zeolite in an initial concentration;
after contacting the zeolite comprising ions of a base metal with the source of palladium ions in an aqueous medium, the ion-exchanged base metal is present in the zeolite in a final concentration; and
the final concentration is within about 10% of the initial concentration.

23. The process of claim 16, wherein the ion-exchanged palladium, calculated as elemental palladium, is present in the zeolite in an amount of from about 0.01% to about 4.0% by weight, based on the total weight of the calcined ion-exchanged zeolite on a volatile-free basis.

24. The process of claim 16, wherein:
the ion-exchanged base metal is Cu and the Cu, calculated as CuO, is present in the zeolite in an amount of from about 0.1% to about 4.0% by weight, based on the total weight of the calcined ion-exchanged zeolite on a volatile-free basis;
the ion-exchanged palladium, calculated as elemental palladium, is present in the zeolite in an amount of from about 0.1% to about 4.0% by weight, based on the total weight of the calcined ion-exchanged zeolite on a volatile-free basis; and
at least about 50% of the Cu and at least about 50% of the palladium reside in the ion-exchange sites in the pore network of the zeolite.

\* \* \* \* \*